United States Patent [19]

Murphy et al.

[11] Patent Number: 5,044,788
[45] Date of Patent: Sep. 3, 1991

[54] GROOVED MOUNTING FOR BEARING SEPARATOR

[75] Inventors: Richard F. Murphy; Steven C. Santelman, both of Torrington, Conn.

[73] Assignee: The Torrington Company, Torrington, Conn.

[21] Appl. No.: 542,888

[22] Filed: Jun. 25, 1990

[51] Int. Cl.$^5$ .............................................. F16C 33/16
[52] U.S. Cl. .................................. 384/577; 384/560; 384/572
[58] Field of Search ............... 384/523, 526, 527, 564, 384/572, 576, 577, 560

[56] References Cited

U.S. PATENT DOCUMENTS

| | | | |
|---|---|---|---|
| 2,026,802 | 1/1936 | Scribner | 384/577 |
| 2,969,266 | 1/1961 | Schaeffler | 384/564 |
| 3,353,881 | 11/1967 | Steinert | 384/577 |
| 4,153,309 | 5/1979 | Markfelder et al. | 384/576 |
| 4,336,972 | 6/1982 | Dagiel | 384/611 |
| 4,391,476 | 7/1983 | Negele et al. | 384/572 X |
| 4,907,898 | 3/1990 | Dickinson | 384/572 X |

FOREIGN PATENT DOCUMENTS

| | | | |
|---|---|---|---|
| 33801 | 10/1970 | Japan | 384/526 |
| 10140 | 1/1980 | Japan | 384/527 |

Primary Examiner—Thomas R. Hannon
Attorney, Agent, or Firm—Glenn B. Foster

[57] ABSTRACT

A bearing apparatus includes a race, the race being tubular and having first and second axial ends. One of the axial ends having a restrainer. A separator having first and second annular rims is interconnected by separator bars being annularly spaced apart. A plurality of rolling elements are retained by the separator bars and rims. A flexure member permits the separator to be radially flexed in a first radial direction for axial displacement with respect to the race and to be radially flexed in a second radial direction, opposite said first radial direction, for being restrained with respect to the race. The race may be an inner race or an outer race. A second race interrelates with the separator to lock the separator in the second radial direction. The restrainer is preferably an annular groove formed in the race.

11 Claims, 4 Drawing Sheets

GROOVED MOUNTING FOR BEARING SEPARATOR

BACKGROUND OF THE INVENTION

This invention relates generally to bearings and more particularly, to a bearing assembly wherein separator and roller elements can be positioned relative to a first race, and a flange portion of the separator will maintain the position of the separator within the first race when the second race is positioned relative to the first race.

Separators are utilized to guide roller assemblies within the inner and outer races of bearings. Typically, flanges are formed in one of the races to ensure that the separators, and the associated rolling elements, are not axially displaced from position. Extra machining and heat treatment steps are necessary to produce the flanges on the races.

Slots have been formed in separators such that a diameter of the separator can be altered whereby the separator can be positioned between two flanges in a race. An example of a separator insertable into a race between two flanges is U.S. Pat. No. 3,353,881. This configuration requires that two flanges be affixed to the race, as well as the associated machining and heat treatment.

U.S. Pat. No. 2,026,802 illustrates an angular contact roller bearing having a slotted bridge to separate the rollers. The slots in the bridge permit compression of the bridge such that the bridge can be inserted into the outer race. The outer race must contain a flange to maintain the positioning of the bridge within the race.

U.S. Pat. No. 4,336,972 illustrates a unitized bearing assembly in which a sleeve portion of the bearing is slotted such that the sleeve may be compressed to engage with another portion of the bearing to create the unitized bearing. The sleeve portion is attached to a housing portion of the bearing requiring machining of the housing portion.

The foregoing illustrates limitations known to exist in present bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a bearing apparatus including a race, the race being tubular and having first and second axial ends. One of the axial ends having a restrainer. A separator having first and second annular rims is interconnected by separator bars being annularly spaced apart. A plurality of rolling elements are retained by the separator bars and rims. A flexure member permits the separator to be radially flexed in a first radial direction for axial displacement with respect to the race and to be radially flexed in a second radial direction, opposite said first radial direction, for being restrained with respect to the race.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
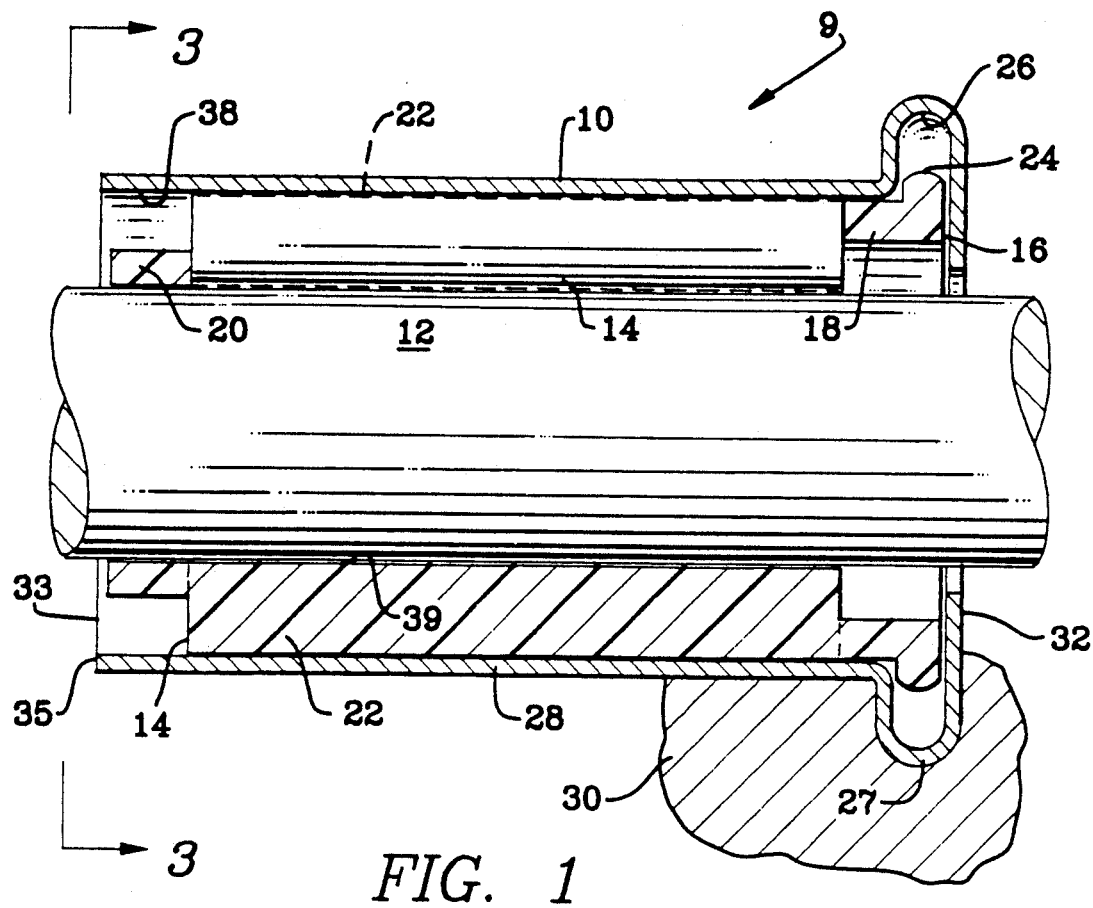
FIG. 1 is a cross sectional side view illustrating an embodiment of a grooved mounting for a bearing separator of the instant invention.
Figure 2:
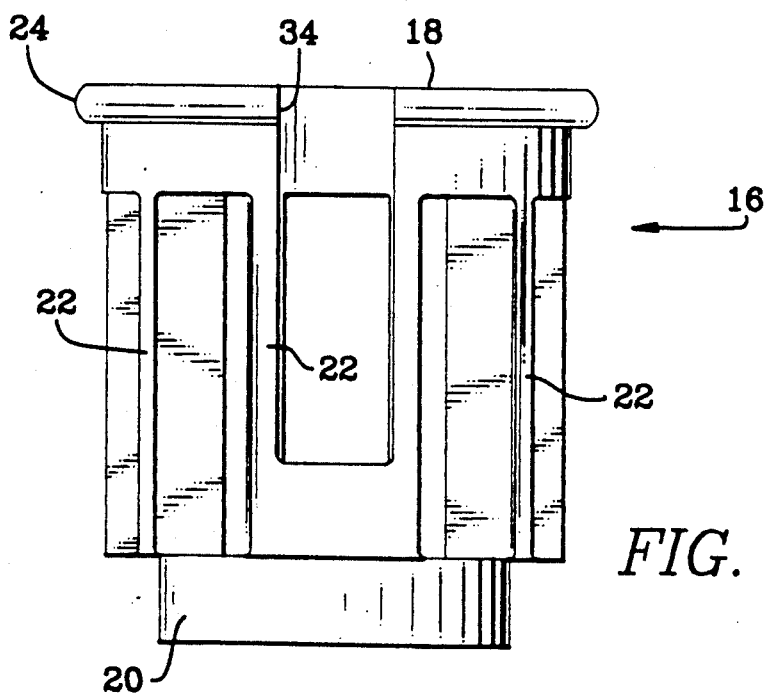
FIG. 2 is a side elevational view of a separator as used in the FIG. 1 embodiment.

In this specification, identical elements in different figures are referenced by identical reference characters.

A bearing apparatus 9 includes a first annular race 10 and a second annular race 12 which are rotatably spaced by a plurality of rolling elements 14. A separator 16 is used to space the rolling elements 14 with respect to each other. Even though the term separator is used throughout the specification, it is to be understood that this application pertains equally to separators, retainers and cages (which pertain to the direction which the roller elements are restrained when the separator is removed from the annular races 10, 12).

Roller bearings are shown in this application. It is to be understood that ball bearings, needle bearings, or any other type of bearings are intended to be covered by the scope of this invention.

The separator 16 includes a first annular rim 18 and a second annular rim 20. The two annular rims 18 and 20 are interconnected by a plurality of separator bars 22 which maintains the spacing between the rolling elements 14.

Figure 7:
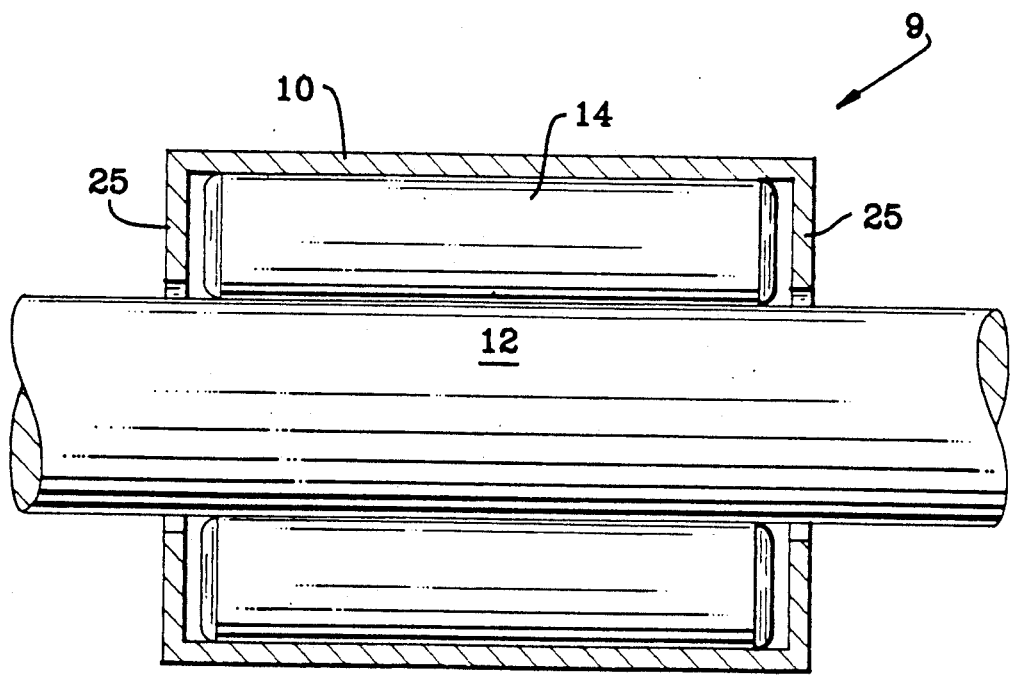
FIG. 7 is a cross sectional side view illustrating a prior art bearing mounting utilizing flanges.

A radially extending annular projection 24 engages an annular groove or restrainer 26 formed in the first race 10, preventing axial displacement of the separator 16 with respect to the first race 10. The restrainer 26 may be of any configuration which the annular projection 24 engages and locks therewith. The annular groove has been found especially applicable, and in the remainder of the application the retainer will be referred to as an annular groove 26. In this manner, the prior art flanges 25 (illustrated in FIG. 7), being perpendicularly affixed to one of the races to prevent relative axial displacement between the separator and the race, ar not required.

As illustrated in FIG. 1, the first annular race 10 may be a drawn casing 28. An annular groove 26 may be formed as a shaped shoulder 27 of a tubular drawn casing 28. The shaped shoulder 27 may function to retain the drawn casing 28 with respect to a housing 30. The drawn casing 28 must be shaped and heat treated to produce shaped shoulder 27.

In this configuration, only one axial side 32 of the drawn casing 28 has a shaped shoulder 27. The separator 16 can thereby be inserted through an opening 33 in a second axial side 35 of the drawn casing 28 by compression of the first annular rim 18.

To permit insertion of the separator 16 into the drawn casing, a slot 34 or plurality of slots are formed in the first annular rim 18 and the annular projection 24. The slots permit compression of the annular projection and the first annular rim 18 (which originally have a greater outer diameter than an inside diameter of bore 38 formed in the drawn casing 28) whereby the annular projection can be inserted into the bore 38, positioned, and then expanded such that the annular projection will engage the annular groove 26. The radial cross-section of the first annular rim 18 including the annular projection 24 will remain substantially circular during this compression or contraction.

Figure 6:
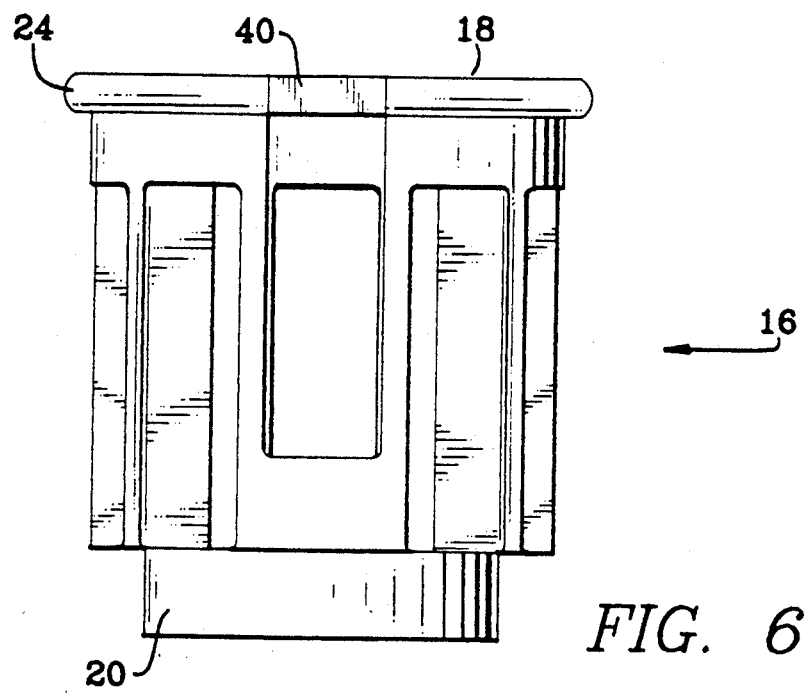
FIG. 6 is a side elevational view of a separator similar to FIG. 2, except with an elastic insert replacing the groove.

Alternately, elastic inserts 40 may be formed in the first annular rim 18 and the annular projection 24 as illustrated in FIG. 6. This configuration permits annular contraction and expansion of the annular projection 24 and the first annular rim 18. Insertion of the separator 16 into the drawn casing 28 (similar to as described with the slot in the previous paragraphs) is thereby permitted.

After the separator 16 is inserted in the drawn casing 28, the inner race 12 is inserted into a bore 39 formed in the separator. With the inner race 12 positioned within the bore 39, the first annular rim 18 is prevented from compressing, and thereby the annular projection is locked into engagement with the annular groove 26, preventing release of the separator 16 from the drawn casing 28.

Figure 3:
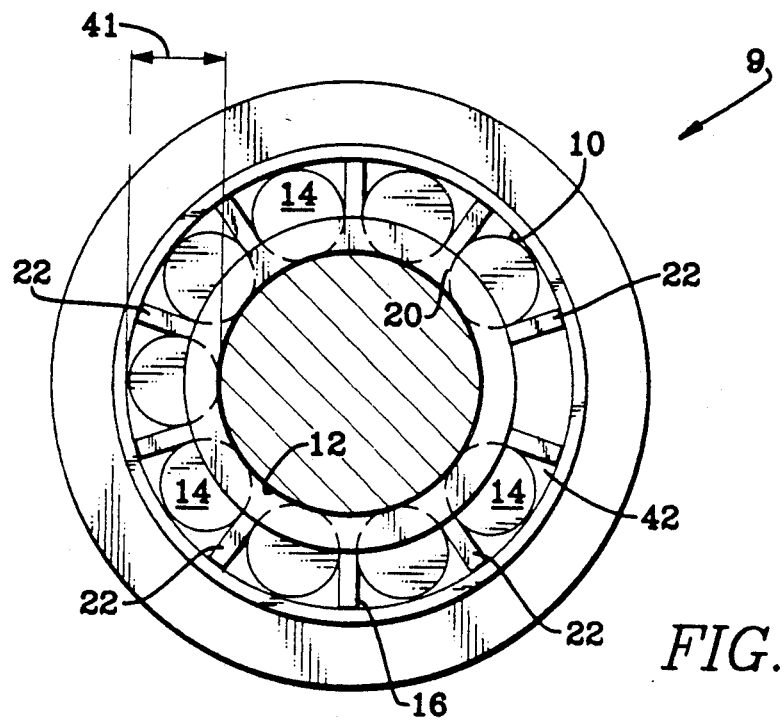
FIG 3 is an end view as taken along sectional lines 3—3 of FIG. 1.

As shown in FIG. 3, the second annular rim 20 is not as thick as the space 41 between the first annular race 10 and the drawn casing 28. A passage 42 is thereby created permitting travel of lubricants between outside of the bearing to the rolling elements 14. This configuration is useful in instances where the bearings are located in environments where oil or other lubricants or coolants are freely flowing, for example, as a pump shaft support in automatic transmissions.

Figure 4:
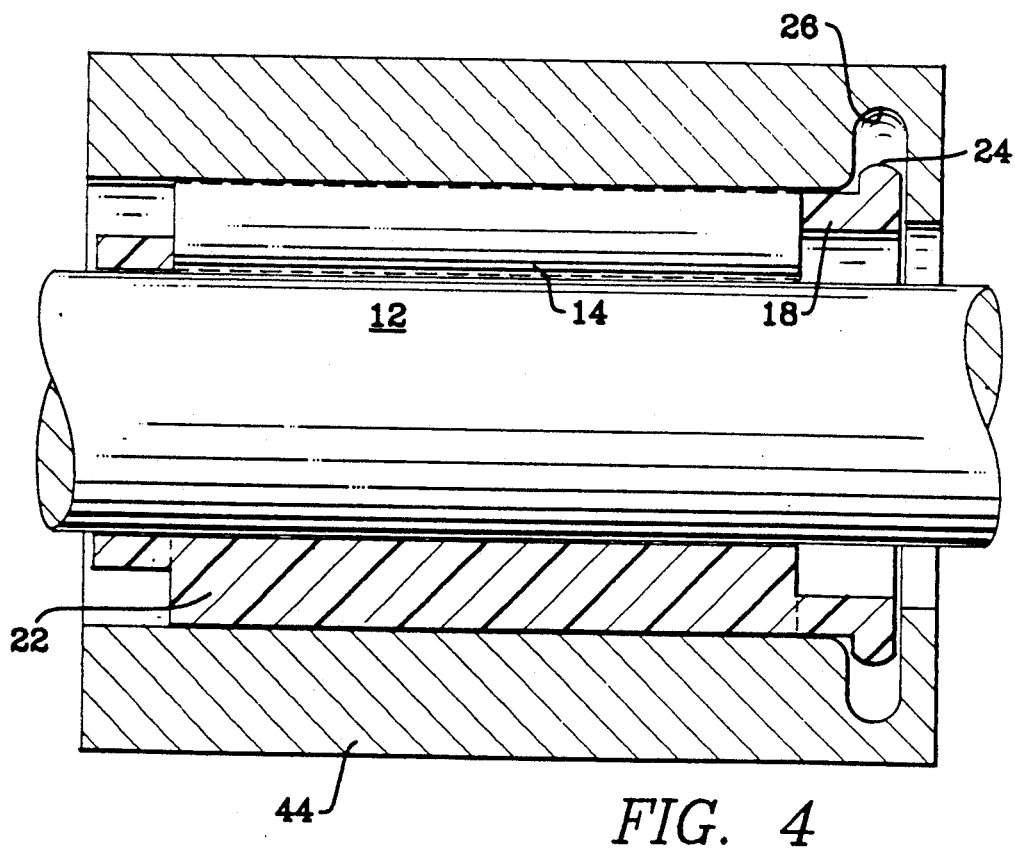
FIG. 4 is a cross sectional side view illustrating an alternate embodiment of a grooved mounting for a bearing separator of the instant invention.

Alternately, as illustrated in FIG. 4, an annular groove 26 may be formed in a solid outer race 44. An identical separator 16 to that illustrated in FIG. 1 may be used, wherein the radially extending projection 24 on the first annular ring 18 is inserted into the annular groove 26 to prevent axial displacement of the separator 16 relative to the solid outer race 44.

Since the annular projection 24 interacts with the annular groove to restrict relative displacement between the solid outer race 44 and the separator 16, there is no need for flanges to be attached to either of the annular races 12 or 44.

Figure 5:
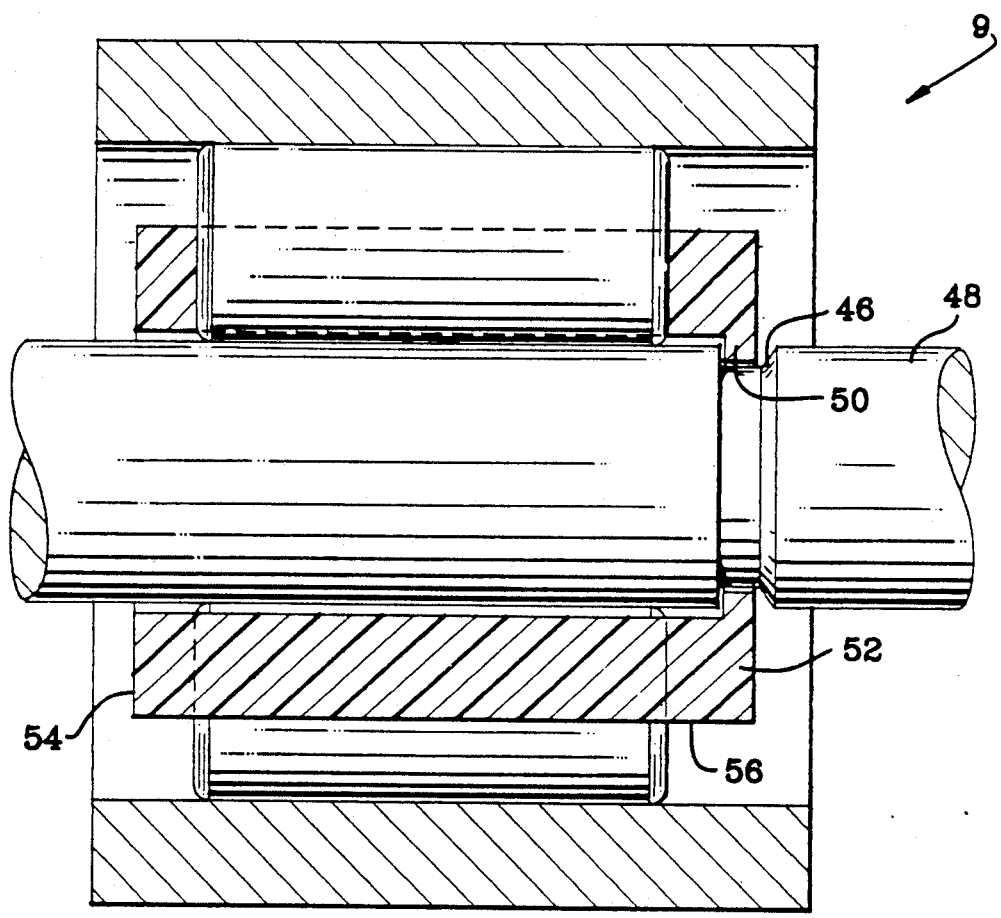
FIG. 5 is a cross sectional side view illustrating yet another alternate embodiment of a grooved mounting for a bearing separator of the instant invention.

The previously described configurations illustrate inwardly facing annular grooves 26 interacting with outwardly extending annular projections 24. FIG. 5 illustrates an outwardly exposed annular groove 46 formed in an inner race 48, which interacts with an inwardly extending annular projection 50 connected to a first annular rim 52 of a separator 54.

A groove 56 (or elastic insert as previously described) is formed in the annular projection 50 and the annular rim 52 such that the annular projection 50 may be forced outward to permit slipping the separator 54 over the inner race, and subsequent engagement of the annular projection 50 and the annular groove 46. An outer race 58 is thereupon slipped over the separator 54 preventing disengagement of the annular projection 50 with the annular groove 46.

Having described the invention, what is claimed is:

1. A bearing apparatus to be inserted into a first tubular race having a retainer formed therein, the bearing apparatus comprising:
    a separator comprising a first and a second annular rim spaced from each other to define two axial ends of the separator, the two annular rims are connected to each other by a plurality of separator bars which are spaced about a periphery of said first and second annular rims, a plurality of rolling elements of a uniform diameter being interspaced between the plurality of separator bars, the first annular rim being displaceable between a first diameter and a second diameter; and
    a radially outword extending annular projection affixed to the first annular rim, a slot extends through the first annular rim and the annular projection permitting circumferential contraction of the first annular rim to the first diameter from the second diameter during relative axial displacement between the separator and the first tubular race, and when the first annular rim is of the second diameter, the annular projection engages the retainer limiting relative axial displacement between the separator and the first tubular race, the radial cross-section of the first annular rim remaining substantially circular during circumferential contraction.

2. The bearing apparatus as described in claim 1, further comprising:
    a second race which interacts with the first rim, maintaining the first annular rim in said second diameter.

3. The bearing apparatus as described in claim 1, wherein the slot means extends perpendicular to said first annular rim.

4. The bearing apparatus as described in claim 1, further comprising:
    elastic inserts formed in the first annular rim, permitting compression of the first annular rim between said first diameter and said second diameter.

5. The bearing apparatus as described in claim 1, wherein the second annular rim has a configuration wherein lubricants or coolants may travel adjacent the second annular rim, to and from the rolling elements.

6. The bearing apparatus as described in claim 1, wherein the first tubular race is an outer race.

7. The bearing apparatus as described in claim 1, wherein the restrainer is an annular groove.

8. A bearing apparatus comprising:
    a tubular race having a tubular bore of a first diameter and an annular groove of a second diameter which is larger than said first diameter;
    a separator having first and second annular rims axially spaced apart and interconnected by separator bars which are circumferentially spaced and adapted to hold rolling elements between said separator bars and rims, said second annular rim being resistent to circumferential contraction, the first annular rim being disposed within the annular groove while the second annular rim is located within the tubular race remotely from said annular groove; and
    the first annular rim having a radially outward annular projection formed on the outer periphery thereof and a slot formed therein to permit circumferential contraction of the annular projection between a first dimension and a second dimension, said first dimension being between said first and second diameter, said second dimension being no greater than said first diameter, wherein a radial cross-section of the first annular rim remains substantially circular during said circumferential contraction.

9. The bearing apparatus as described in claim 8, wherein the slot extends completely through the first annular rim.

10. The bearing apparatus as described in claim 8, further comprising an elastomeric insert contained within said slot.

11. The bearing apparatus as described in claim 8, wherein the slot extends substantially axially and radially relative to said first annular rim.

* * * * *